United States Patent [19]

Willis

[11] 4,145,639
[45] Mar. 20, 1979

[54] TELEVISION RECEIVER PROTECTION CIRCUIT

[75] Inventor: Donald H. Willis, Indianapolis, Ind.

[73] Assignee: RCA Corporation, New York, N.Y.

[21] Appl. No.: 846,196

[22] Filed: Oct. 27, 1977

[51] Int. Cl.² ............................................. H01J 29/70
[52] U.S. Cl. ..................................... 315/411; 358/243
[58] Field of Search ................. 315/411; 358/190, 243

[56] References Cited

U.S. PATENT DOCUMENTS

| | | | |
|---|---|---|---|
| 3,742,242 | 6/1973 | Morio et al. | 358/190 X |
| 3,885,201 | 5/1975 | Fernsler | 358/190 X |

*Primary Examiner*—Theodore M. Blum
*Attorney, Agent, or Firm*—Eugene M. Whitacre; Paul J. Rasmussen; Joseph Laks

[57] ABSTRACT

A deflection circuit of a television receiver produces scanning current in a deflection winding. The deflection circuit includes first and second terminals at which respective terminals first and second deflection rate voltages are developed. The first deflection rate voltage includes, under fault conditions, a fault component voltage present during at least a portion of a deflection cycle. The fault component voltage is substantially absent from the second deflection rate voltage. A protection circuit includes combining means coupled to the first and second terminals for combining the first and second deflection rate voltages for producing a fault signal at a third terminal under fault conditions. A circuit responsive to the voltage developed at the third terminal provides a disabling signal for disabling normal television receiver operation when the fault signal is present.

18 Claims, 14 Drawing Figures

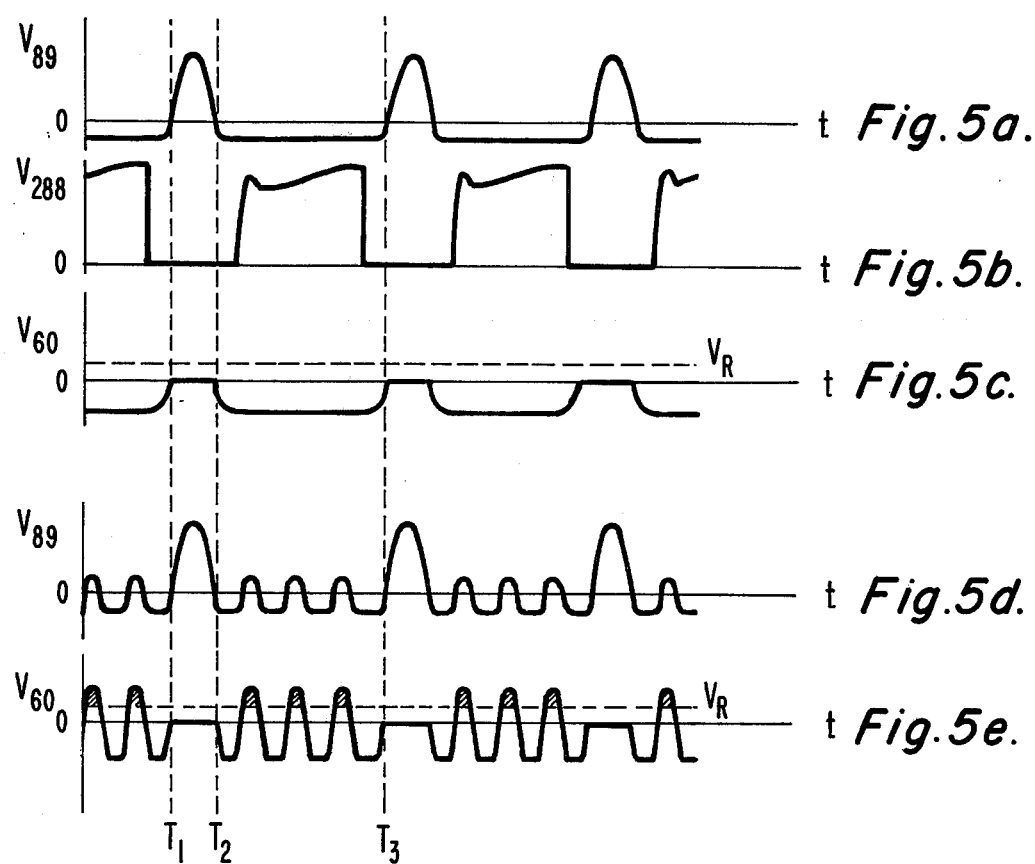
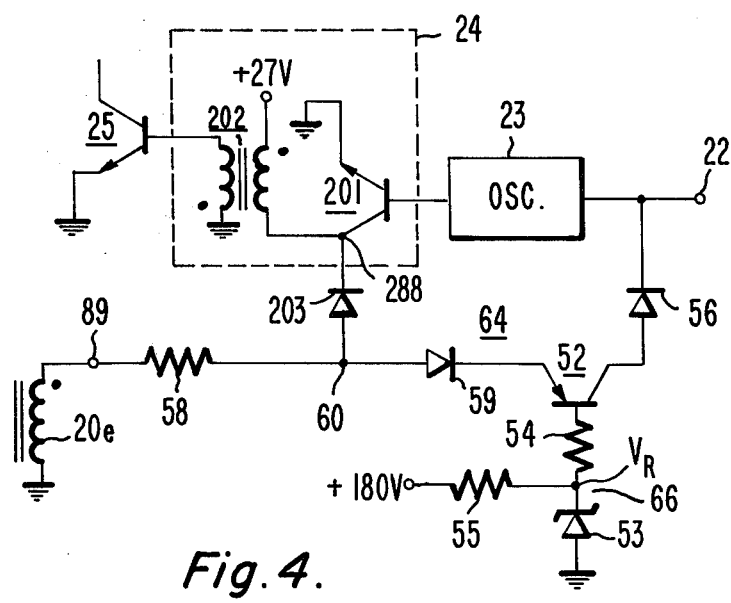

TELEVISION RECEIVER PROTECTION CIRCUIT

BACKGROUND OF THE INVENTION

This invention relates to high voltage protection circuits for television receivers.

The high voltage accelerating potential for the ultor of a cathode ray tube is typically obtained by rectification of the voltage developed across a tertiary winding of a horizontal output transformer. To prevent dangerous increases in the high voltage, many television receivers include a protection circuit which senses the high voltage by means of a secondary winding coupled to the horizontal output transformer. The retrace pulses across the secondary winding are rectified and filtered. If the amplitude of the pulses increases sufficiently, a disabling signal disables normal television receiver operation and prevents a dangerous increase in the high voltage.

Under certain fault conditions, the increase in high voltage is not accompanied by an increase in retrace pulse amplitude of sufficient magnitude to cause a disabling signal to be generated. Such fault conditions may occur when the switch, such as an SCR, of a B+ switching regulator circuit becomes short-circuited. It is, therefore, desirable to design a protection circuit that will provide a disabling signal under fault conditions including the above-mentioned fault condition.

SUMMARY OF THE INVENTION

A television receiver protection circuit comprises a deflection winding and a deflection circuit coupled to the deflection winding for producing scanning current in said deflection winding during a deflection cycle. The deflection circuit includes first and second terminals at which respective terminals first and second deflection rate voltages are developed. The first deflection rate voltage includes, under fault conditions, a fault component voltage present during at least a portion of the deflection cycle. The fault component voltage is substantially absent from said second deflection rate voltage. A combining circuit is coupled to the first and second terminals for combining the first and second deflection rate voltages for producing a fault signal at a third terminal under fault conditions. A safety circuit responsive to the voltage developed at the third terminal provides a disabling signal for disabling normal television receiver operation when the fault signal is present.

BRIEF DESCRIPTION OF THE DRAWING

FIG. 4 is a circuit diagram of a portion of another protection circuit embodying the invention; and FIGS. 5a–5e illustrate waveforms associated with the circuit of FIG. 4.

DESCRIPTION OF THE INVENTION

Figure 1:
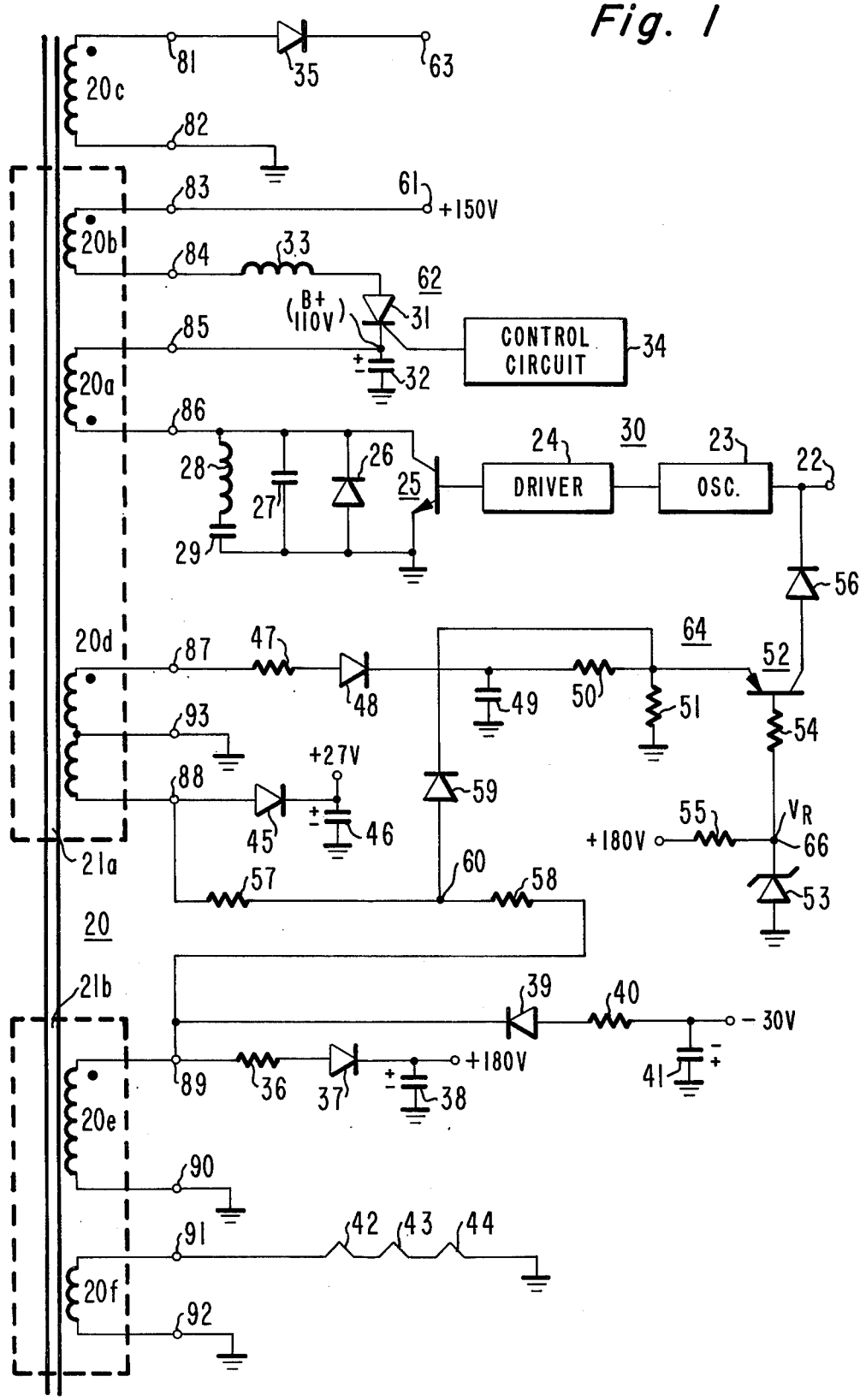
FIG. 1 is a circuit diagram of a protection circuit embodying the invention.

In FIG. 1, control signals at an input terminal 22 from a conventional automatic frequency and phase control circuit, not shown, are coupled to a horizontal oscillator 23 of a horizontal deflection circuit 30 for synchronizing the horizontal scanning current in a horizontal deflection winding 28 during each deflection cycle. Horizontal deflection circuit 30, operating in a conventional manner, comprises oscillator 23, a horizontal driver stage 24, a horizontal output switching transistor 25, a damper diode 26, a retrace capacitor 27, and a serially coupled horizontal deflection winding 28 and an "S" shaping capacitor 29.

A regulated source of B+ operating voltage, illustratively shown as +110 volts in FIG. 1, is obtained at a terminal of a filter capacitor 32 and is coupled to a deflection circuit 30 through a primary winding 20a of a horizontal output transformer 20. The B+ voltage is derived from a source of unregulated voltage at a terminal 61, illustratively shown as +150° volts, and is coupled to an SCR regulator 62 comprising a secondary winding 20b of horizontal output transformer 20, an integrating inductor 33 and an SCR 31, with a cathode of the SCR coupled to filter capacitor 32. During each deflection cycle, gating signals are coupled from a control circuit 34 to the gate of SCR 31. Regulation is achieved by varying the conduction time of SCR 31 by means of the gating signals. Regulator 62 may be similar in design to that disclosed in U.S. Pat. No. 3,832,595, granted to W. F. W. Dietz.

A tertiary winding 20c of horizontal output transformer 20 provides, through a diode 35, a high voltage accelerating potential for beam current at a terminal 63.

Figure 2:
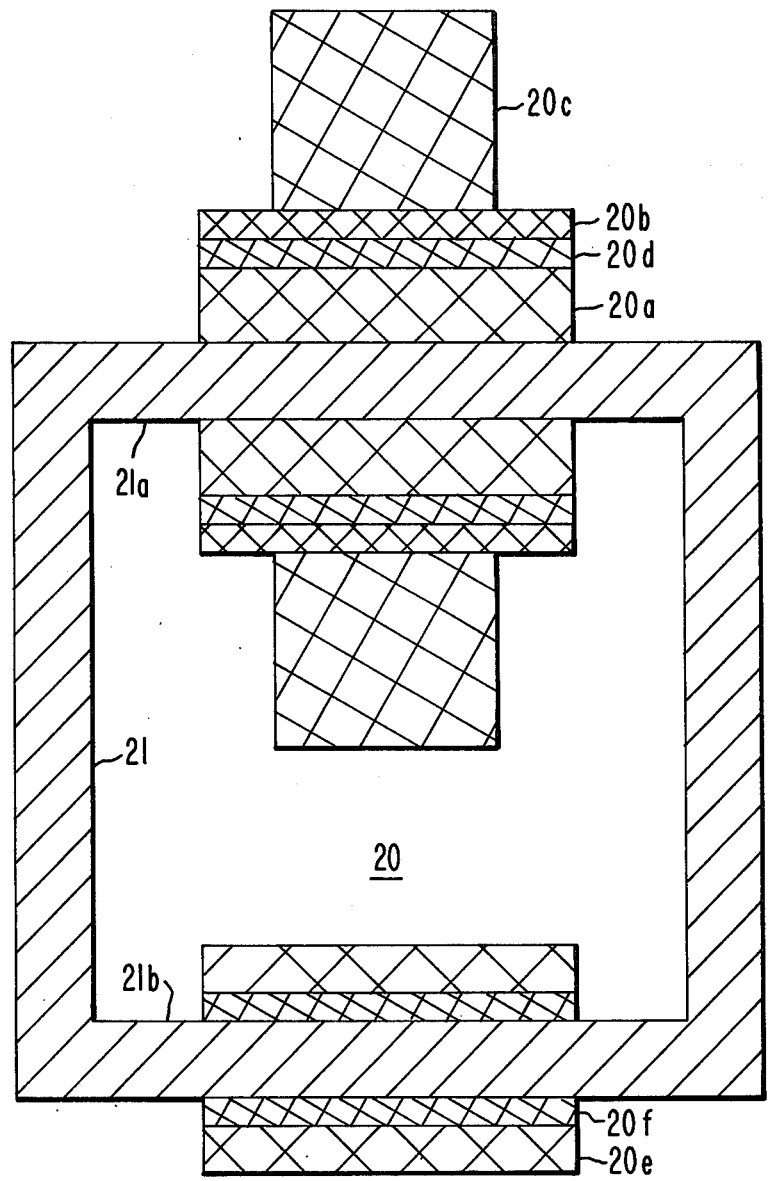
FIG. 2 is a cross-sectional view of the structure of a horizontal output transformer which may be used in the circuit of FIG. 1.

As illustrated in FIG. 2, horizontal output transformer 20 comprises a rectangular core 21 of magnetic material over, which is wound at various locations along the core, a plurality of windings 20a–20f, with winding 20a comprising a primary winding, windings 20b, 20d, 20e, and 20f comprising secondary windings, and winding 20c comprising a high voltage tertiary winding. As illustrated schematically in FIG. 1, the ends of windings 20a–20f are coupled to terminal points 81–92, which provide connections to the remaining circuitry. A terminal 93 couples to ground an intermediate tap point of secondary winding 20d. The construction and winding of transformer 20 is such as to provide third harmonic tuning of the tertiary winding 20c by means of leakage inductance and stray capacitance.

Secondary windings 20d, 20e, and 20f function in part to provide operating voltages to various receiver circuits, such as the audio, video, horizontal and vertical deflection, and filament heater circuits. A +27 volt supply, filtered by a capacitor 46, is obtained from terminal 88 through a diode 45. A +180 volt supply, filtered by a capacitor 38, is obtained from a terminal 89 through a resistor 36 and a diode 37. Also obtained from terminal 89 through a diode 39 and a resistor 40 is a −30 volt supply, filtered by a capacitor 41. Heater current for filaments 42, 43, 44 of the cathodes of the television receiver cathode ray tube is obtained from secondary winding 20f.

The voltages developed across the various secondaries may provide other functions, not shown in FIG. 1. For example, a positive retrace pulse developed at terminal 89 may be coupled to a phase discriminator circuit for providing synchronized scan. A negative retrance pulse developed at terminal 88 may be coupled to video processing circuits for cathode ray tube blanking purposes.

A positive retrace pulse developed at a terminal 87, associated with winding 20d, is coupled through a resistor 47 and a diode 48 to a safety circuit 64 for disabling normal television receiver operation, should the high voltage at terminal 63 increase too greatly under most fault conditions.

Diode 48 retrace rectifies the voltage at terminal 87, and a filtered DC voltage representative of the high voltage is developed across a capacitor 49. Voltage dividing resistors 50 and 51 are coupled across capacitor 49. The emitter of a comparator transistor 52 is coupled to the junction point of resistors 50 and 51. The base of transistor 52 is coupled through a resistor 54 to a reference voltage $V_R$ established at a terminal 66 by a zener diode 53 having its cathode coupled to the +180 volt supply through a resistor 55. The collector of transistor 52 is coupled to input terminal 22 of horizontal deflection circuit 30 through a diode 56.

Should the high voltage at terminal 63 increase too greatly, the retrace pulse amplitude at terminal 87 and the voltage at the emitter of transistor 52 increase, under most fault conditions, sufficiently to forward bias transistor 52 into conduction. A disabling voltage signal is coupled to terminal 22, increasing the frequency of oscillator 23 sufficiently to create an unviewable raster, decreasing the high voltage, and disabling normal television receiver operation.

Under certain fault conditions, the increase in high voltage is not accompanied by a sufficient increase in retrace pulse amplitude at terminal 87 to forward bias transistor 52 into conduction. Such fault conditions may occur, for example, if the regulator SCR 31 is short-circuited, or overload conditions prevent SCR 31 from turning off.

To provide disabling of normal television receiver operation under the above-mentioned fault conditions, the voltage $V_{88}$ at terminal 88 of secondary winding 20d is coupled to a combining terminal 60 through a resistor 57, and the voltage $V_{89}$ at terminal 89 of secondary winding 20e is coupled to combining terminal 60 through a resistor 58. Terminal 60 is coupled through a diode 59 to safety circuit 64 at the emitter of transistor 52.

Figure 3A:
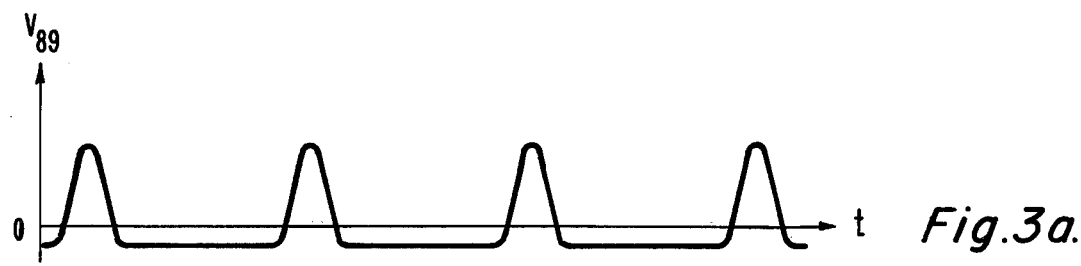
FIGS. 3a–3f illustrate waveforms associated with the circuit of FIG. 1.
Figure 3B:
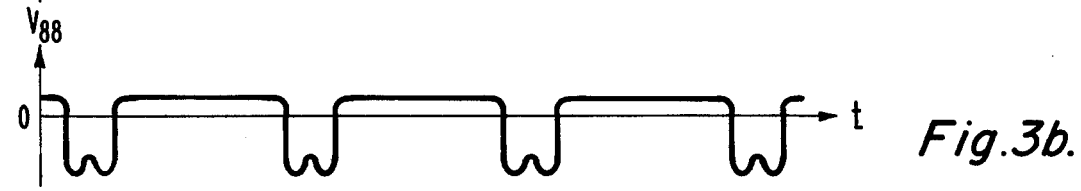
Figure 3C:
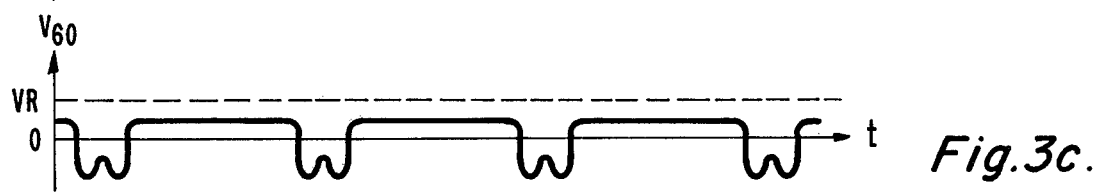

Under normal operation, as illustrated in FIG. 3a, the deflection rate voltage $V_{89}$ comprises a positive retrace pulse in which a third harmonic component occurs and a negative constant trace voltage in which no substantial third harmonic voltage occurs. Similarly, as illustrated in FIG. 3b, the deflection rate voltage $V_{88}$ comprises a negative retrace pulse in which a third harmonic component also occurs and a positive constant trace voltage in which no substantial third harmonic voltage occurs. $V_{88}$ and $V_{89}$ are proportionately combined at terminal 60 to produce a voltage $V_{60}$, as illustrated in FIG. 3c. The proportioning of the two voltages by resistors 57 and 58 is such that, under normal conditions, $V_{60}$ is sufficiently less positive than $V_R$ for the entire deflection interval to maintain diode 59 nonconducting during the entire interval. The voltage $V_{60}$, therefore, cannot bias transistor 52 into conduction, and normal television receiver operation is maintained.

Figure 3D:
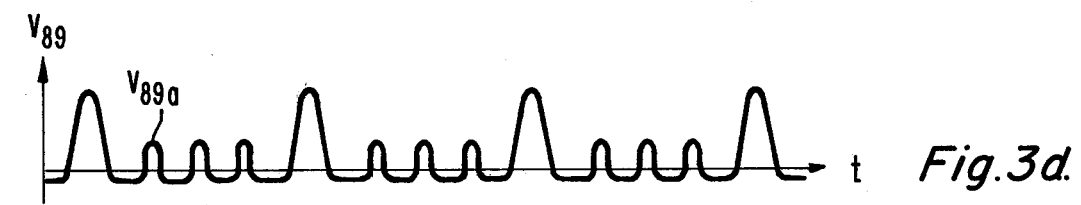
Figure 3E:
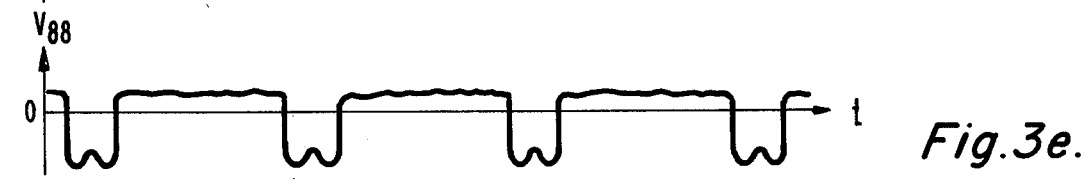
Figure 3F:
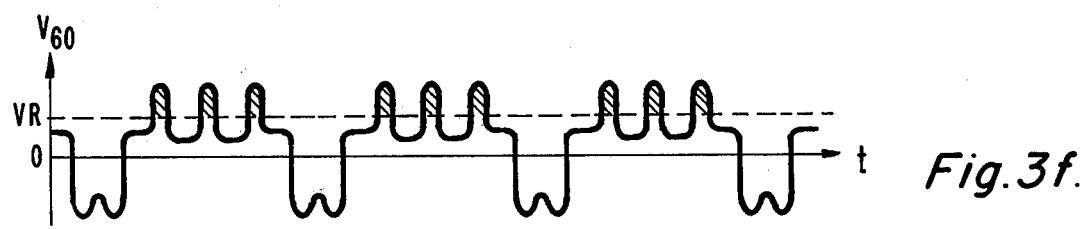

Under the above-described fault conditions, such as the condition of a short-circuited regulator SCR 31, it has been observed that the deflection rate voltage $V_{89}$ at terminal 89 of secondary winding 20e during the trace interval includes a relatively large ringing component $V_{89a}$, as illustrated in FIG. 3d, with a frequency of the third harmonic of the retrace frequency. The deflection rate voltage $V_{88}$ at terminal 88 of secondary winding 20d, however, does not include any significant third harmonic component during the trace interval, only a small ripple voltage being noticeable, as illustrated in FIG. 3e. This difference in component voltage content during the trace interval occurs because of the tighter coupling of winding 20d to the primary winding 20a relative to winding 20e, as will be explained in more detail subsequently. When both deflection rate voltages $V_{88}$ and $V_{89}$ are now combined at terminal 60, the positive trace excursions of the third harmonic voltage of $V_{60}$ are sufficiently more positive than the reference voltage $V_R$ to bias both diode 59 and transistor 52 into conduction during the interval of the shaded portion of the waveform $V_{60}$, as illustrated in FIG. 3f. Thus, when the fault component voltage or third harmonic component voltage is present in secondary winding 20e under fault conditions, safety circuit 64 will provide a disabling signal to disable normal television receiver operation.

The invention may also be practiced by replacing resistor 57 with a diode having a cathode coupled to a terminal 88 and by coupling the cathode of diode 59 directly to input terminal 22 of horizontal deflection circuit 30.

It is believed that the appearance in secondary winding 20e of a ringing third harmonic voltage during the trace interval under fault conditions and the absence of such a fault component voltage in secondary winding 20d may be explained by examining the structure of horizontal output transformer 20. As illustrated in FIG. 2, primary winding 20a is wound over a leg 21a of rectangular core 21. Wound directly over primary winding 20a are secondary windings 20d and 20b, respectively. The tertiary winding 20c comprises the outermost winding layers. Over the oppositely disposed leg 21b of core 21 are located secondary windings 20e and 20f.

For the above-described transformer structure, secondary winding 20d may be considered tightly coupled with primary winding 20a; that is, because of their close proximity, substantially all the air path and core path magnetic flux linking primary winding 20a also links secondary winding 20d. Secondary winding 20e, since it is oppositely disposed on leg 21b, is loosely coupled with primary winding 20a; that is, a substantial portion of the magnetic flux linking the primary winding, namely, much of the air path flux, does not link the loosely coupled secondary winding 20e.

Consider now a fault condition, wherein regulator SCR 31 is short circuited. Large currents flow through secondary winding 20b, which is in series with SCR 31. These currents induce a voltage in tertiary winding 20c which, because of the third harmonic tuning, includes a relatively large third harmonic component voltage. This induced third harmonic component voltage induces relatively large third harmonic magnetic flux components during the trace interval in the core 21 of horizontal output transformer 20. This third harmonic flux component traverses the low reluctance core path and links the loosely coupled secondary winding 20e, producing at termainl 89 the ringing third harmonic trace voltage $V_{89a}$ of FIG. 3d.

During the trace interval, since at least one of damper diode 26 and output transistor 25 is conducting, the voltage across primary winding 20a is clamped at a voltage of +110 volts of the B+ voltage. The induced third harmonic flux in core leg 21a induces a counterelectromagnetic force and an opposing current to produce a counter flux in an air path that links the primary winding 20a in order to maintain a constant trace voltage across primary winding 20a.

Since secondary winding 20d is tightly coupled with primary winding 20a, substantially the entire flux linking primary winding 20a, including the air path flux, also links tightly coupled secondary winding 20d, resulting in a relatively constant trace voltage across secondary winding 20d, as illustrated. Since secondary winding 20e is loosely coupled, however, a substantial portion of the air path flux linking primary winding 20a does not link winding 20e. A relatively large third harmonic component can develop in the loosely coupled winding 20e and may be used for providing disabling signals under fault conditions.

For some television receivers, even under normal operating conditions, the third harmonic component voltage may become relatively large as increasing beam current is drawn from terminal 63. The magnitude of the negative retrace pulses of FIG. 3b near the center of the retrace interval will decrease substantially. Some third harmonic voltage may even be present just before the beginning and just after the end of the retrace interval. It is possible, therefore, for the voltage at combining terminal 60, even under normal conditions, to exceed $V_R$ at certain times. Normal television receiver operation will be unnecessarily disabled.

For such television receivers, an alternate circuit configuration, such as illustrated in FIG. 4, may be used. As illustrated in FIG. 4, the deflection rate voltage that is to be combined at terminal 60 with the deflection rate voltage $V_{89}$ does not come from a secondary winding 20d but from the collector of a horizontal driver transistor 201 of driver circuit 24 at a terminal 288. The collector voltage waveform is illustrated in FIG. 5b as a deflection rate drive voltage $V_{288}$. This voltage is inverted by a coupling transformer 202 and supplied to the base of horizontal output transistor 25 in a conventional manner.

The deflection rate voltage $V_{288}$ is combined at terminal 60 with the deflection rate voltage $V_{89}$, illustrated in FIG. 5a, from secondary winding 20e through a diode 203 poled to conduct during the retrace interval. As illustrated in FIG. 5c, under normal conditions, the voltage $V_{60}$ at terminal 60 equals zero during the retrace interval from times $t_1$–$t_2$ and is proportional to the negative trace voltage of $V_{89}$ from times $t_2$–$t_3$. At no time during the deflection interval $t_1$–$t_3$ does $V_{60}$ become positive and/or exceed the reference voltage $V_R$. Transistor 52 is not biased into conduction, and normal television receiver operation is maintained.

If the television receiver is operated under the previously described fault conditions, the deflection rate voltage $V_{89}$ includes a harmonic fault component voltage during the trace interval $t_2$–$t_3$, as illustrated in FIG. 5d. The deflection rate voltage $V_{288}$, during this same interval, being the collector voltage of driver transistor 201, does not contain a component fault voltage and is substantially unchanged from the normal condition voltage, illustrated in FIG. 5b. The combined voltage $V_{60}$ at terminal 60, as illustrated in FIG. 5e, now contains a fault signal voltage during the interval $t_2$–$t_3$ that includes a third harmonic fault component voltage. The positive peaks of the fault signal voltage during the trace interval $t_2$–$t_3$ is sufficiently greater than $V_R$ during the shaded intervals of FIG. 5e to activate safety circuit 64 and disable normal television receiver operation.

What is claimed is:

1. A television receiver protection circuit comprising:
a deflection winding;
a deflection circuit coupled to said deflection winding for producing scanning current in said deflection winding during a deflection cycle, said deflection circuit including first and second terminals at which respective terminals first and second deflection rate voltages are developed, said first deflection rate voltage including under fault conditions a fault component voltage present during at least a portion of said deflection cycle, said fault component voltage substantially absent from said second deflection rate voltage during said portion;
combining means coupled to said first and second terminals for combining said first and second deflection rate voltages for producing a fault signal at a third terminal under fault conditions; and
a safety circuit responsive to the voltage developed at said third terminal for providing a disabling signal for disabling normal television receiver operation when said fault signal is present.

2. A protection circuit according to claim 1 wherein said first terminal is coupled to a first secondary winding of a horizontal output transformer of said deflection circuit.

3. A protection circuit according to claim 2 wherein said second terminal is coupled to a second secondary winding of said horizontal output transformer.

4. A protection circuit according to claim 3 wherein said first secondary winding is loosely coupled with a primary winding of said horizontal output transformer.

5. A protection circuit according to claim 3 wherein said horizontal output transformer is tuned to a harmonic frequency of the retrace frequency of said deflection circuit, the frequency of said fault component voltage including a substantial voltage of said harmonic frequency.

6. A protection circuit according to claim 3 wherein said fault component voltage comprises a ringing frequency during at least a portion of a trace interval of said deflection cycle.

7. A protection circuit according to claim 6 wherein said first secondary winding is loosely coupled with a primary winding of said horizontal output transformer.

8. A protection circuit according to claim 7 wherein said second secondary winding is tightly coupled with said primary winding.

9. A protection circuit according to claim 2 wherein said deflection circuit comprises horizontal oscillator and driver means responsive to a source of synchronizing signals for providing horizontal rate signals; and
horizontal output switching means coupled to said horizontal oscillator and driver means and responsive to said horizontal rate drive signals for producing said scanning current.

10. A protection circuit according to claim 9 wherein said second terminal is coupled to said horizontal oscillator and driver means.

11. A protection circuit according to claim 10 wherein said horizontal oscillator and driver means includes a horizontal driver transistor, said second terminal coupled to said horizontal driver transistor.

12. A television receiver safety circuit comprising:
a horizontal deflection winding;
a horizontal output transformer coupled to said horizontal deflection winding;
horizontal output means coupled to said horizontal deflection winding for generating deflection current in said horizontal deflection winding;

horizontal oscillator and driver means coupled to said horizontal output means for providing horizontal drive signal to said horizontal output means, said horizontal oscillator and driver means developing a first deflection rate square wave voltage at a first terminal within said horizontal oscillator and driver means;

a secondary winding coupled to said horizontal output transformer, a second terminal of said secondary winding having developed thereat a second deflection rate voltage which under fault conditions includes a fault component voltage present during at least a portion of a deflection cycle;

means coupled to said first and second terminal for combining said first and second deflection rate voltages at a third terminal; and protection means coupled to said terminal and responsive to the voltage developed at said third terminal for providing a disabling signal when said fault conditions occur.

13. A safety circuit according to claim 12 wherein said combining means comprises diode means poled to conduct during a portion of said horizontal deflection cycle.

14. A safety circuit according to claim 12 wherein said horizontal output transformer is tuned to a harmonic frequency of the retrace frequency of said deflection circuit, the frequency of said fault component voltage being substantially said harmonic frequency.

15. A safety circuit according to claim 14 wherein said secondary winding is loosely coupled with a primary winding of said horizontal output transistor.

16. A safety circuit according to claim 14 wherein said first terminal is coupled to one of a collector and an emitter of a horizontal driver transistor of said horizontal oscillator and driver means.

17. A television receiver protection circuit comprising:

a deflection winding;

a deflection circuit coupled to said deflection winding for producing scanning current in said deflection winding during each deflection cycle;

a transformer coupled to said deflection circuit, including first, second, and third windings, said second winding loosely coupled with said first winding and said third winding tightly coupled with said first winding wherein a ringing voltage is present in said second winding during a trace interval under fault conditions and said ringing voltage is substantially absent in said third winding; and protection means coupled to said second and third windings and responsive to the voltages developed in said second and third windings for providing a disabling signal for disabling normal television receiver operation when said television receiver is operated under said fault conditions.

18. A television receiver protection circuit comprising:

a deflection winding;

a deflection circuit coupled to said deflection winding for producing scanning current in said deflection winding during each deflection cycle;

a transformer coupled to said deflection circuit including a first winding in which a ringing voltage is developed during a trace interval when said television receiver is operated under fault conditions and including a second winding in which said ringing voltage is substantially absent under fault conditions;

combining means coupled to said transformer for combining the voltages developed across said first and second windings; and protection means coupled to said combining means for providing a disabling signal when said television receiver is operated under said fault conditions.

* * * * *